United States Patent
Keller

(10) Patent No.: US 7,303,089 B2
(45) Date of Patent: Dec. 4, 2007

(54) ANTI-SIPHON FUEL CAP AND FILLER TUBE ASSEMBLY

(76) Inventor: Russell D. Keller, 837 Marina Dr., Boulder City, NV (US) 89005

( * ) Notice: Subject to any disclaimer, the term of this patent is extended or adjusted under 35 U.S.C. 154(b) by 0 days.

(21) Appl. No.: 11/361,778

(22) Filed: Feb. 24, 2006

(65) Prior Publication Data

US 2006/0138139 A1  Jun. 29, 2006

Related U.S. Application Data

(63) Continuation-in-part of application No. 10/970,212, filed on Oct. 21, 2004, now abandoned.

(51) Int. Cl.
*B65D 41/06* (2006.01)
*B65D 53/00* (2006.01)
*B65B 3/00* (2006.01)

(52) U.S. Cl. ............ 220/295; 220/293; 220/304; 220/DIG. 33; 220/86.3; 141/350

(58) Field of Classification Search ........ 220/300–302, 220/293, 295, 296, DIG. 33, 304, 86.3, 86.2, 220/255, 256.1, 298; 141/348–350
See application file for complete search history.

(56) References Cited

U.S. PATENT DOCUMENTS

| | | | | |
|---|---|---|---|---|
| 1,434,322 A | * | 10/1922 | Wigzell | 220/300 |
| 1,643,237 A | * | 9/1927 | Cambridge | 220/86.3 |
| 1,862,000 A | * | 6/1932 | Britton et al. | 568/747 |
| 1,882,097 A | * | 10/1932 | Stant | 220/302 |
| 1,887,700 A | * | 11/1932 | Stevens | 220/295 |
| 1,928,569 A | * | 9/1933 | Moreland | 220/86.3 |
| 1,964,277 A | | 6/1934 | Stant | |
| 1,995,007 A | * | 3/1935 | Myers | 220/86.3 |
| 2,696,100 A | | 12/1954 | Nehls | |
| 4,434,903 A | | 3/1984 | Cooke | |
| 5,031,790 A | | 7/1991 | Keller | |
| 5,169,015 A | | 12/1992 | Burke | |
| 5,230,438 A | * | 7/1993 | Kind et al. | 220/240 |
| 5,405,040 A | | 4/1995 | Keller | |
| 6,082,565 A | * | 7/2000 | Harrold | 215/218 |
| 6,213,331 B1 | | 4/2001 | Morgan et al. | |

\* cited by examiner

*Primary Examiner*—Robin A. Hylton
(74) *Attorney, Agent, or Firm*—Janine Rickman Novatt; Weiss & Moy, P.C.

(57) ABSTRACT

An improved fuel cap and filler tube assembly for a fuel tank is provided. A spring-biased resilient and compressible closure member in the fuel cap seats inside an inlet opening of the filler tube when the fuel cap is secured to the filler tube. The filler tube includes an anti-siphon elbow.

6 Claims, 3 Drawing Sheets

ANTI-SIPHON FUEL CAP AND FILLER TUBE ASSEMBLY

RELATED APPLICATIONS AND PATENTS

This application is a continuation-in part of application Ser. No. 10/970,212 filed Oct. 21, 2004, now abandoned, and incorporated herein by reference and related to U.S. Pat. No. 5,405,040 entitled "CAP FOR FUEL INLET" issued on Apr. 11, 1995 in the name of the same inventor as the present patent application and incorporated herein by reference.

FIELD OF THE INVENTION

This invention relates generally to anti-siphon devices. More specifically, this invention relates to an improved fuel cap and filler tube assembly which provides a better seal for substantially preventing fuel tampering or theft.

BACKGROUND OF THE INVENTION

Fuel for running vehicle engines is contained in one or more fuel tanks appropriately mounted on the vehicle. Fuel is admitted to a fuel tank through what is referred to herein as a filler tube. The filler tube extends into the interior of the fuel tank. In order to fill the fuel tank, one must remove the fuel cap from the filler tube to expose an open upper end. The filler tube is closed by the fuel cap at times other than when fuel is being admitted to the fuel tank.

The fuel cap is used to cover the open upper end of the filler tube and also prevents the flow of fuel back out the tank when a car is in an accident, for example, in a rollover accident. The cap also helps to reduce the chances of fuel leaks and their associated dangers and substantially prevents the leakage of fuel vapors from the filler tube, which can be a major source of hydrocarbon emissions.

A fuel cap typically consists of a plastic body with either threads (older caps) or lugs that are received onto the open upper end of the filler tube of the vehicle fuel tank. Caps may be available in standard or locking types. Unfortunately, even locking fuel caps may be breached or compromised permitting fuel theft by siphoning or the like and vandalism. The theft of gas has become of great concern with the rising cost of fuel. In addition, vandals may introduce contaminants or destructive additives such as sugar or water into the fuel.

Accordingly, there has been a need for a novel improved fuel cap and filler tube assembly which is of simplified construction, inexpensive to manufacture, and substantially effective at preventing tampering or theft of the fuel in the fuel tank. The present invention fulfills these needs and provides other related advantages.

SUMMARY OF THE INVENTION

The improved fuel cap and filler tube assembly comprises, generally, a fuel cap having a spring-mounted closure member mounted to the underside of the cap to engage with the upper end of a filler tube to provide a better seal between the fuel cap and the filler tube. The filler tube may include an anti-siphon elbow to further substantially prevent siphoning devices from incursion into the fuel tank.

The filler tube is coupled to a fuel tank. The filler tube allows for fuel to be deposited into the fuel tank. The filler tube at its upper end or top is bounded by an annular shoulder. The shoulder extends about and defines an inlet opening which connects to the interior of the fuel tank. The shoulder has inner and outer margins forming the top of the shoulder. Located along the outer perimeter of the shoulder of the filler tube is a plurality of protrusions.

The fuel cap has a top and a circumferential skirt joined to and extending down from the top in a one-piece casting. The fuel cap includes a plurality of recesses in an interior section of the cap along the circumferential skirt for coupling with the filler tube as hereinafter described. The number of recesses is equal in number to the number of protrusions on the filler tube. The protrusions mate with the recesses in the cap to secure the cap to the upper end of the filler tube.

The spring-mounted closure member is a substantially compressible and resilient cup shaped closure member and includes an annular rim forming the outer perimeter of the closure member. The annular rim has a flat lower surface on the underside of the rim. Mounted on the underside of the annular rim may be a sealing element or gasket member such as an o-ring or the like.

The closure member may be mounted to the underside of the top of the fuel cap by a compression coil spring. An upper end of the spring is coupled to the central interior area of the cap. A lower end of the spring is coupled to a central area of the closure member. The spring exerts a downward pressure on the closure member, thereby securing the protrusions into the corresponding recesses. The coil spring resiliently urges the annular rim downwardly in sealing relation against the shoulder of the filler tube with the sealing element seated therebetween.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
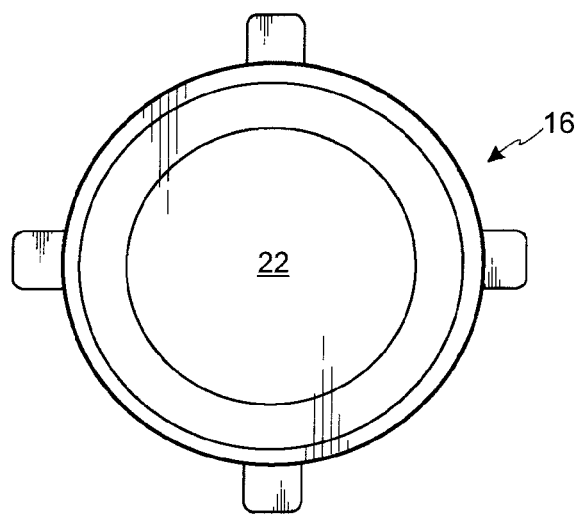
FIG. 1 is a top view of a filler tube embodying the invention.

As shown in the drawings for purposes of illustration, the present invention is concerned with an improved fuel cap and filler tube assembly, generally designated in the accompanying drawings by the reference number 10. The improved fuel cap and filler tube assembly 10 comprises, generally, a fuel cap 12 having a spring-mounted closure member 14 mounted to the underside of the cap to engage with the upper end of a filler tube 16 to provide a better seal between the fuel cap 12 and the filler tube 16. The filler tube 16 may include an anti-siphon elbow 18 to further substantially prevent siphoning devices from incursion into the fuel tank (not shown).

In accordance with the present invention, and as illustrated with respect to a preferred embodiment in FIGS. 1 through 4, the improved fuel cap and filler tube assembly 10 provides a better seal between the fuel cap and the filler tube to substantially prevent tampering and theft of the fuel.

Figure 2:
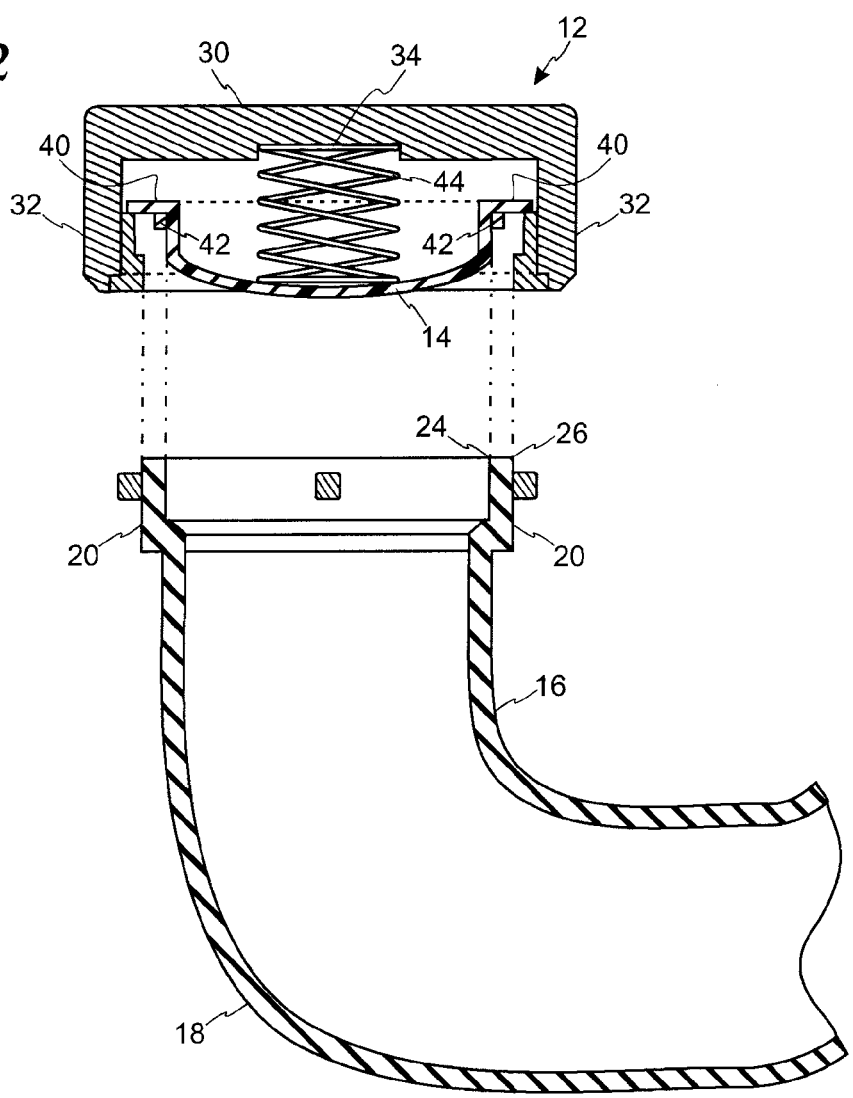
FIG. 2 is a cross sectional assembly view, illustrating the manner in which the improved fuel cap may be coupled to an open upper end of a filler tube, the filler tube having an anti-siphon elbow.
Figure 2A:
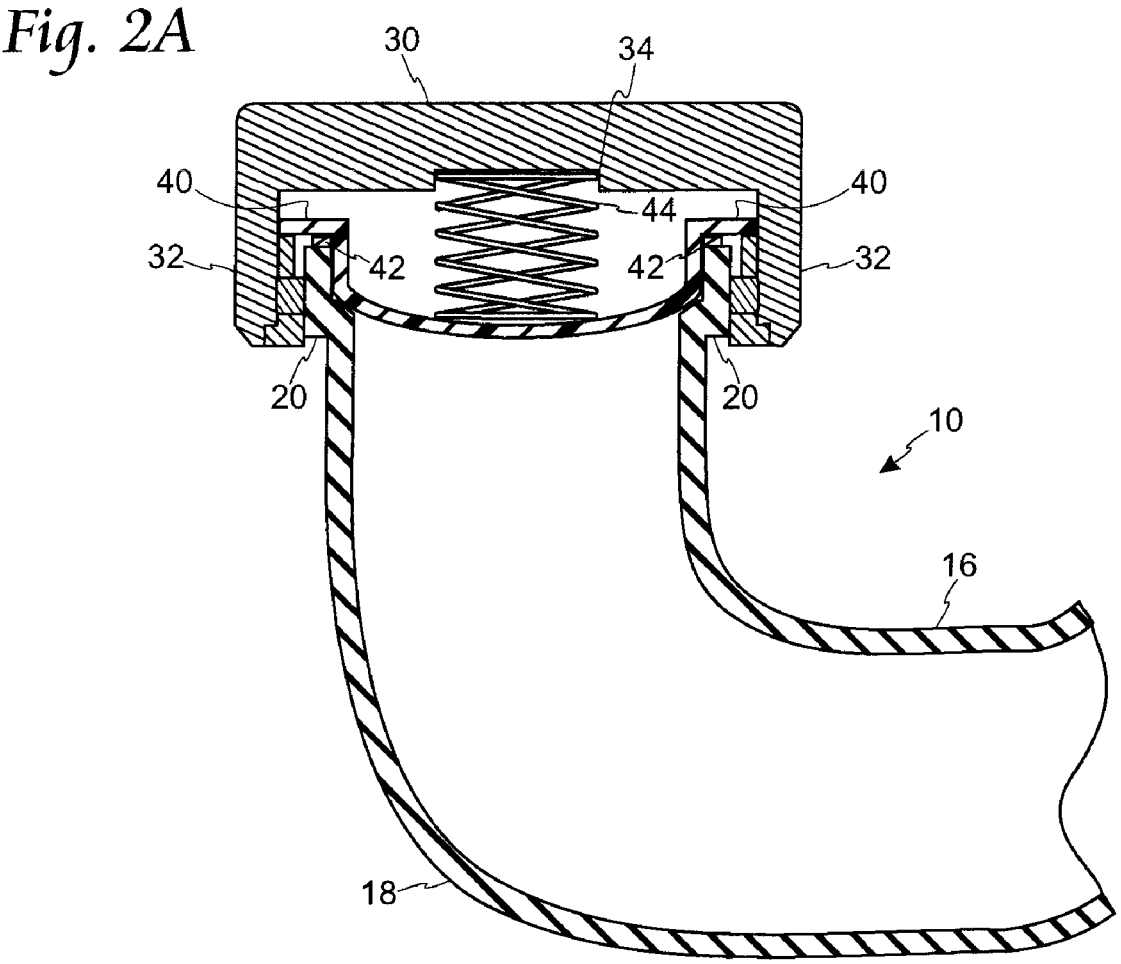
FIG. 2A is a cross sectional perspective view, illustrating the manner in which the improved fuel cap is coupled to the upper end of the filler tube.
Figure 4:
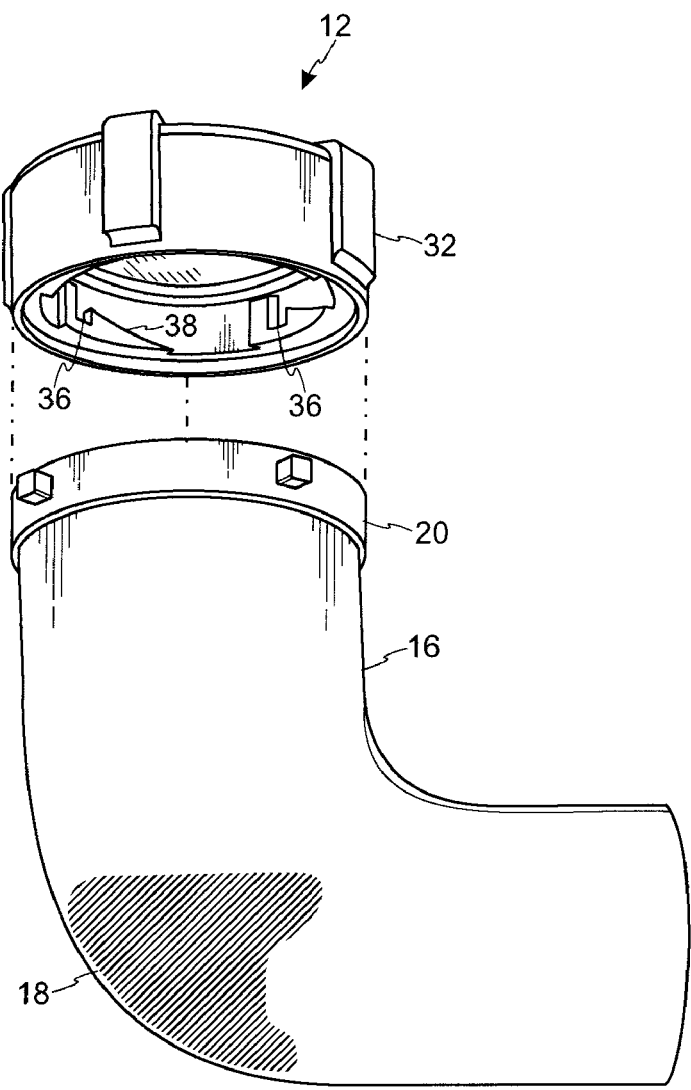
FIG. 4 is an elevated perspective view of the fuel cap and filler tube assembly, illustrating the fuel cap removed from the filler tube.

The filler tube 16 is coupled to a fuel tank (not shown) by welding or the like. The filler tube allows for fuel to be deposited into the fuel tank. As shown in FIGS. 2, 2A, and 4, the filler tube 16 at its upper end or top is bounded by an annular shoulder 20. The shoulder extends about and defines an inlet opening 22 which connects to the interior of a fuel tank (not shown) through the filler tube and through which the fuel is introduced when filling the fuel tank. The shoulder has inner and outer margins 24 and 26 forming the top of the shoulder. As shown in FIG. 1, the inlet opening 22 is substantially circular. Below the shoulder, the filler tube may include the anti-siphon elbow 18 having an angle of about 90 degrees to further prevent siphoning tubes or the like from incursion into the fuel tank. The filler tube is a neck and elbow assembly that is one casting which is inserted and welded into the fuel tank (not shown). When there is surge pressure in the fuel tank, this helps to keep the pressure from cap leakage.

Located along the outer perimeter of the shoulder of the filler tube is a plurality of protrusions 28. In the embodiment shown in FIG. 1, four protrusions are shown. However, any number of protrusions may be located along the outer perimeter of the filler tube without departing from the spirit and scope of the present invention. The protrusions are generally equally spaced and extend out and away from the shoulder of the filler tube. The protrusions are used for locking the fuel cap 12 and the filler tube 16.

Figure 3:
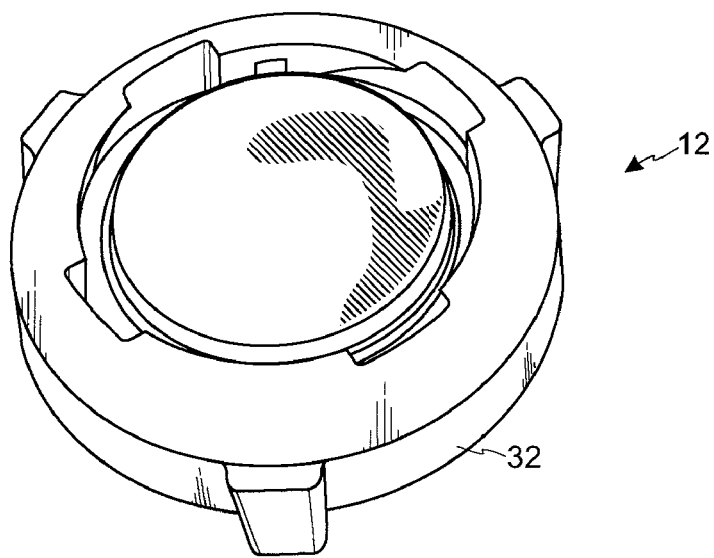
FIG. 3 is a bottom perspective view of the improved fuel cap assembly.

As shown in FIG. 3, the fuel cap 12 has a top portion 30 with a generally circular outline. A circumferential skirt 32 may be joined to and extend down from the top portion. The top portion and the circumferential skirt may be a one-piece casting. As shown in FIGS. 2 and 2A, a groove 34 may be defined in the underside of the top portion 30 in a central interior area for purposes as described hereinafter.

The fuel cap 12 includes a plurality of recesses 36 in an interior section of the cap along the circumferential skirt as shown in FIGS. 3 and 4 for coupling with the filler tube as hereinafter described. The number of recesses is equal in number to the number of protrusions on the filler tube. The recesses run in a vertical direction. A ramp 38 may be formed next to each recess and leads up to and helps form the recess. When the fuel cap 12 is placed over the inlet opening 22 of the filler tube, each protrusion 28 is aligned with a corresponding recess 36. When properly aligned, the protrusions will slide into the corresponding recesses. The protrusions mate with the recesses in the cap to secure the cap to the upper end of the filler tube.

As shown in FIGS. 2 and 2A, the spring-mounted closure member 14 is substantially cup shaped and includes an annular rim 40 forming the outer perimeter of the closure member. The annular rim 40 has a flat lower surface on the underside of the rim. Mounted on the underside of the annular rim may be a sealing element or gasket member 42 such as an o-ring or the like. The sealing element provides a seal between the annular rim of the closure member and the filler tube as hereinafter described.

The closure member 14 may be mounted to the underside of the top portion of the fuel cap 12 by a compression coil spring 44. An upper end of the spring is coupled to the central interior area of the cap. A lower end of the spring is coupled to a central area of the closure member. The upper end bears against the groove 34 in the top portion and the lower end bears on the closure member. The closure member may be made from an elastomer material such as polyurethane which is compressible and resilient to enhance the seal between the closure member and the filler tube as hereinafter described. The central area of the closure member may be substantially rounded to further enhance the seal as shown in FIG. 3.

In use, the fuel cap 12 may be coupled to the filler tube 16 by pushing down and turning the cap 12 on the upper open end of the filler tube. The spring 44 will exert a downward pressure on the closure member 14, thereby securing the protrusions 28 into the corresponding recesses 36. The downward pressure keeps the protrusions mated with the recesses to secure the cap to the filler tube. The coil spring resiliently urges the annular rim downwardly in sealing relation against the shoulder of the filler tube with the sealing element seated therebetween. When coupled to the filler tube, the annular rim 40 overlies the shoulder 20 of the filler tube and the flat lower surface is pressed against the sealing element by the spring. The spring, however, accommodates yieldably resisted upward movement of the closure member. To remove the cap, the cap is turned in the opposite direction. The spring enlarges with relaxation of downward pressure on the closure member.

From the foregoing, it is to be appreciated that the fuel cap disclosed is what is referred to as a quick-closing cap. This is because the cap to secure it in place on the open upper end of the filler tube need be given only a small fraction of a turn with catch structure then engaging establishing an anchored position for the cap. If tampering with the cap occurs, for example, by an attempt to pry the cap off, the closure member will further embed in the upper end of the filler tube thus substantially preventing its removal. Furthermore, the anti-siphon elbow substantially prevents anti-siphon devices from incursion into the fuel tank.

Although a particular embodiment of the invention has been described in detail for purposes of illustration, various modifications may be made without departing from the spirit and scope of the invention. Accordingly, the invention is not to be limited, except as by the appended claims.

I claim:

1. A fuel cap and filler tube assembly, comprising:

a fuel cap having a top portion and a circumferential skirt extending down from the top portion, the underside of the top portion having a groove defined therein and the fuel cap having a plurality of vertical recesses in an interior section of the cap along the circumferential skirt and, adjacent to each of the vertical recesses, a ramp leading upward thereto;

a filler tube having an annular shoulder at the top of the filler tube with the shoulder extending about the top of the filler tube and defining an inlet opening for the filler tube, the shoulder having a plurality of protrusions extending from the outer perimeter thereof, each of the protrusions being adapted to pass along one of the ramps and into one of the vertical recesses to secure the fuel cap to the filler tube;

a closure member coupled to an underside of the cap, the closure member exerting a downward pressure to cover the inlet opening of the filler tube when the fuel cap is secured to the filler tube, the downward pressure keeping the plurality of protrusions mated with the recesses to secure the cap to the filler tube, the closure member comprising:
a compressible and resilient cup-shaped closure member having an annular rim; and
a spring having a first end coupled to a central interior area of the fuel cap and within said groove and a second end coupled to a central area of the compressible and resilient cup-shaped closure member.

2. The fuel cap and filler tube assembly according to claim 1, wherein the filler tube has an anti-siphon elbow below the shoulder, the anti-siphon elbow and shoulder comprised of a one-piece casting.

3. The fuel cap and filler tube assembly according to claim 1, wherein the central area of the closure member is substantially rounded.

4. The fuel cap and filler tube assembly according to claim 1, wherein the closure member is made from polyurethane.

5. The fuel cap and filler tube assembly according to claim 1, wherein the top portion and circumferential skirt comprise a one-piece casting.

6. The fuel cap and filler tube assembly according to claim 1, wherein said annular rim has a flat lower surface for receiving a sealing element.

* * * * *